Figure 1:
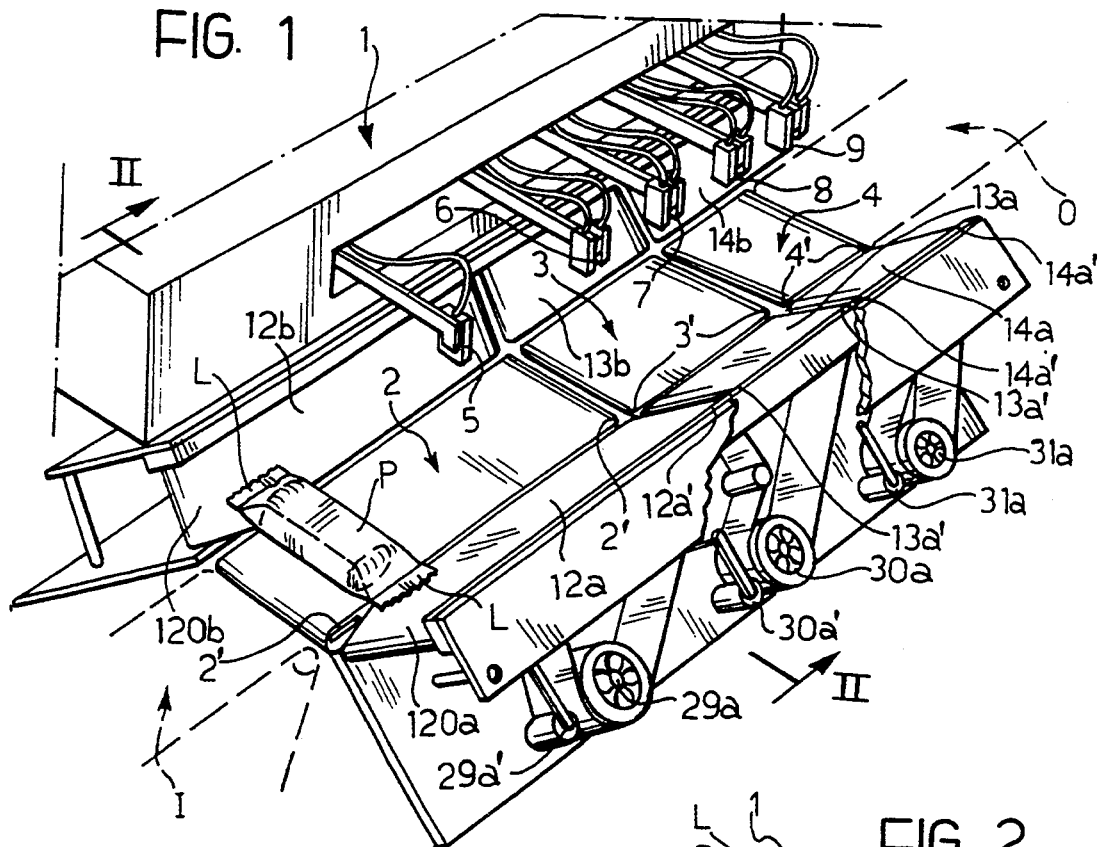

United States Patent [19]

Francioni et al.

[11] Patent Number: 5,373,685
[45] Date of Patent: Dec. 20, 1994

[54] DEVICE AND A METHOD FOR TRANSPORTING PRODUCTS IN PACKAGES WITH FLAGS

[75] Inventors: Renzo Francioni, Prato Sesia; Cerutti Giuliano, Borgomanero, both of Italy

[73] Assignee: Cavanna S.p.A., Prato Sesia, Italy

[21] Appl. No.: 5,764

[22] Filed: Jan. 15, 1993

[30] Foreign Application Priority Data

Jan. 17, 1992 [IT] Italy ................. 092A000031

[51] Int. Cl.$^5$ ................. B65B 7/08; B65G 47/31
[52] U.S. Cl. ................. 53/482; 53/374.7; 198/817
[58] Field of Search ........... 53/396, 482, 481, 480, 53/373.5, 374.5, 374.3, 374.4, 373.2, 374.7, 375.5; 198/817, 818

[56] References Cited

U.S. PATENT DOCUMENTS

| | | | |
|---|---|---|---|
| 2,356,472 | 8/1944 | Rothaug | 53/374.2 X |
| 2,462,254 | 2/1949 | Campbell | 53/387.2 X |
| 3,015,920 | 1/1962 | Saumsiegle | 53/373.4 X |
| 3,628,651 | 12/1971 | Wolzak | 198/817 X |
| 3,629,993 | 12/1971 | Chant, Jr. | 53/374.3 X |
| 4,832,179 | 5/1989 | Simmons | 198/461 |

FOREIGN PATENT DOCUMENTS

| | | |
|---|---|---|
| 1217119 | 12/1970 | United Kingdom . |
| 1227131 | 4/1971 | United Kingdom . |
| 2063199 | 6/1981 | United Kingdom . |
| 2163121 | 2/1986 | United Kingdom . |
| 2170164 | 7/1986 | United Kingdom . |

*Primary Examiner*—James F. Coan
*Attorney, Agent, or Firm*—Knobbe, Martens, Olson et al.

[57] ABSTRACT

A device for transporting products in packages with flaps includes a conveyor, for example, of the belt type, which is divided into several sections in cascade in which, as well as base or central portions, there are also side-wall portions for cooperating with and supporting the end flaps of the packages to prevent any undesirable rotation or piling-up of the products, particularly when they are supported on the main conveyor surface in unstable positions.

24 Claims, 1 Drawing Sheet

DEVICE AND A METHOD FOR TRANSPORTING PRODUCTS IN PACKAGES WITH FLAGS

The present invention relates in general to the automatic handling of products and, in particular, to the transportation of products in packages each having at least one end flap.

In many industrial sectors, particularly in the food industry, products are commonly inserted in packages which have end flaps.

These packages are usually of the type generally known as "flow-packs" which are produced from a film formed into a tubular wrapper in which the products are inserted and which is passed through one or more closure stations which flatten, seal and cut the wrapper in the portions between successive products, creating two flattened flaps at the ends of each package produced.

The presence of the flaps is usually considered an obstacle to the subsequent handling of the packaged products.

For example, if the packaged products are to be advanced lengthwise (that is, with the two flaps of each package aligned in the direction in which the products advance), the two flaps constitute flexible, compressible end portions of generally indeterminate shape which do not facilitate, or may even prevent, the subsequent placing of the products close together.

The foregoing also applies substantially if the packages are advanced crosswise, that is, with the two end flaps aligned perpendicular to the direction of advance.

As a result of the presence of the two flaps, the transverse dimension of each package is, in fact, generally indeterminate and the package has generally flexible end portions (with resilient behaviour) and this hinders the further handling of the packages.

For this reason, in at least some applications, after they have been formed, the two end flaps are bent against the ends of the package so as not to project significantly beyond the space occupied by the product packaged.

The present invention has been developed particularly with the object of solving the problems which arise in advancing products in packages with end flaps on a conveyor, such as an endless motor-driven belt, when the products have cross-sections such that they are supported on the conveyor in a generally unstable manner.

In other words this relates to products which, because of their shapes, are supported on the conveyor in conditions such that even limited dynamic stresses can alter the positions in which the products are supported on the conveyor.

For example, whereas a biscuit or a bar of chocolate supported flat on a conveyor can be considered to have a cross-section such that it is supported in a very stable manner, a bar with, for example, a hexagonal, polygonal, or even circular cross-section is generally fairly unstable; in fact, in the latter case, even a modest lateral force can tip the product over so that it moves (in the case of a bar with a polygonal cross-section) from a position in which it is supported on one face to a position in which is supported on another face or even, in the case of a bar with a circular cross-section, so that it rolls along the conveyor.

Products with cross-sections of this kind are difficult to handle automatically, particularly as regards situations in which they are gathered together or accumulated, that is, situations in which a change is made from a continuous or substantially continuous flow, in which each product is spaced from the preceding and following products in the flow, to a condition in which the products are generally close together.

In this case, although the mechanical stresses which accompany the formation of a gathering or accumulation (usually as a result of the slowing of the flow of products) are very limited, instead of simply being gathered together or accumulated, the products tend to pile up. For example, in the case of products in the form of bars of hexagonal cross-section, arranged side by side, it can easily be seen that even a slight force in a direction such as to bring the products closer together (such as that which arises when an accumulation condition is established) results in a risk of adjacent products piling up, due to their facing sides being brought close together and cooperating like ramps. This risk cannot simply be avoided by means of restraining elements which prevent the products from rising; at least in some situations, the presence of such restraining elements, combined with the tendency of the products to pile up spontaneously, may cause the products to become jammed, possibly with disastrous consequences as regards the operation of the handling system.

The object of the present invention is to provide a solution which eliminates the problems set out above, in a radical manner.

According to the present invention, this object is achieved by a device for transporting products having the specific characteristics recited in the following claims.

The invention also relates to a respective handling method.

In summary, the present invention is based on the recognition of the fact that, during the handling of products having cross-sections such that they are supported in an essentially unstable manner (in the terms defined above), instead of constituting a problem, the presence of at least one end flap on the package may be utilised to improve the handling of the packaged products.

Figure 2:
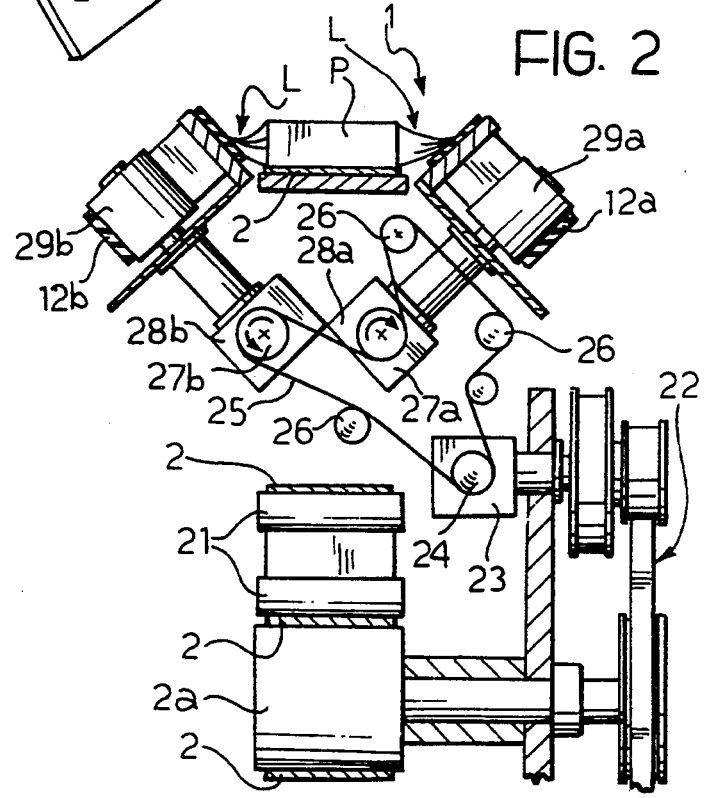

The invention will now be described, purely by way of non-limiting example, with reference to the appended drawings, in which:

FIG. 1 shows schematically a device for transporting products according to the invention, and FIG. 2 is a section taken on the line II—II of FIG. 1.

In the drawings, a device for the automatic transportation of products P in packages with end flaps L is generally indicated 1.

In the embodiment illustrated, the products are food products constituted essentially by bars of hexagonal cross-section in packages of the type generally known as "flow-packs".

In the embodiment illustrated, the products P are advanced crosswise on the device 1, that is, with their longer sides oriented transverse the direction of advance. The end flaps L of the flow-pack packages containing the products P are thus aligned transverse their direction of advance on the device 1.

In general, the device 1 is intended to operate between two conveyors, for example, of the endless belt type, which act as a supply conveyor I and an output or discharge conveyor O for the products, respectively. In particular, the device 1 has the function of gathering together the packaged products arriving from the conveyor I and regulating the flow supplied to the output conveyor O.

By way of reference, the device 1 may operate according to the criteria described in U.S. Pat. No. 4,962,844 in the name of the present Applicant.

For this purpose, the device 1 includes a main conveyor unit constituted by three motor-driven belt conveyors indicated 2, 3 and 4, on which the products P advance and are supported.

Above the belt conveyors 2, 3 and 4 are infra-red photodetector devices 5 to 9, the function of which is to detect the passage of the products P and the positions in which they are advancing on the underlying belts 2 to 4 so as to send, to a unit which controls the operation of the device (for example, a PLC controller, not shown), signals which enable the unit to effect a feedback operation on the motors (not shown in detail) which advance the belts 2 to 4. This all takes place, for example, according to the criteria described in the Unites States patent cited above.

In particular, each photodetector unit 6 to 9 is constituted by two detector elements side by side. This is so that they can detect and identify more precisely and reliably the achievement of a condition in which the products P are gathered close together. In this connection, reference may be made to the specification of British patent application GB-A-2 244 806, also in the name of the same Applicant.

It should be noted, however, that the reference in the present description to a device for controlling the advance of products P should be considered purely as an example and certainly not as limiting. In fact, the present invention may be applied, in general, wherever there is a problem in handling a flow of products in packages having at least one end flap. For example, still within the field of the automatic packaging of products and, in particular, of food products, the invention may usefully be used in a packaging machine of the type which is intended to form multiple packages of the type generally known as "multi-packs".

An important characteristic of the solution according to the invention is that each of the belt conveyors 2, 3 and 4 is flanked by two side-wall-like lateral conveyors 12a, 12b (conveyor 2) 13a, 13b (conveyor 3), 14a, 14b (conveyor 4).

In practice, in the drawings, the suffixes a and b indicate, respectively, the side-wall conveyors on the right-hand side and on the left-hand side of the main conveyors 2, 3 and 4 in the direction in which the products P advance through the device 1.

The side-wall conveyors in question are generally specularly symmetrical, with respect to the longitudinal, vertical median plane of the device 1. For this reason, specific reference will be made in the following description to the side-wall conveyors 12a, 13a and 14a on the right-hand side of the device, and it should be understood that the homologous conveyors on the left-hand side have identical characteristics reproduced in a specularly symmetrical manner, with respect to the aforesaid plane.

The solution of the association of a conveyor having a horizontal conveyor pass (typically the upper pass of an endless motor-driven conveyor) with lateral conveyors which are also motor-driven and act as side walls is well known in the art.

However, in the previously-known solutions, the active passes of the conveyors which act as side walls extend vertically, that is, perpendicular to the conveyor surface of the main conveyor which transports and supports the products.

In the solution according to the present invention, on the other hand, the active or conveyor passes of the side-wall conveyors (12a, 12b; 13a, 13b; 14a, 14b) are inclined generally to the main conveyor pass (the conveyors 2, 3, 4) at a generally obtuse angle of the order, for example, of 135° (90°+45°); in other words, the conveyor passes of the side-wall conveyors in question are inclined at about 45° to the horizontal.

As can better be seen in the section of FIG. 2, the positions and/or orientations of the side-wall conveyors 12a, 12b are correlated to the transverse dimensions (widths) of the packages containing the products P so that the end flaps L lie against the side-wall conveyors, the movements of which are synchronised exactly (according to criteria which will be described further below) with those of the respective main conveyors.

In the device according to the invention, the package containing the product P advances within a generally channel-shaped conveyor having:

a central or base portion (defined by the main conveyor 2, 3 or 4) which support the product P, and side-wall conveyors (12a, 12b; 13a, 13b; 14a, 14b) which cooperate with the end flaps L so as to support them and urge them slightly upwards, thus bending them out of alignment with the imaginary horizontal axis about which each product P (and the package containing it) might tend to rotate, as a result of a force exerted in the direction in which the products P advance.

If the products P are shaped like bars with hexagonal cross-sections, this axis, in practice, corresponds to the principal axis of the hexagonal prism defining the shape of each product. Similarly, if the products are cylindrical, the axis corresponds to the axis of the cylinder defining the shape of each product.

The fact that the end flaps L of the packages are supported by the side-wall conveyors means that, even when such a force is exerted, the position of the package as a whole remains unchanged; this is also the case when, as occurs in the device 1 (in this connection, see the description of U.S. Pat. No. 4,962,844), the products in question are gathered together as a result of the formation of an accumulated line of products, in spite of the fact that the facing sides of the products which are gathered close together have ramp-like portions which would tend to favour a slight rotation of the products which could lead to their piling-up.

In the embodiment illustrated, the first two pairs of side-wall conveyors (12a, 12b; 13a, 13b) are almost identical in length (that is, in the direction in which the products P advance) to the corresponding main conveyors 2, 3.

This means that the upstream and downstream ends (which are defined by respective return rollers or, preferably "feathers"—only the edges of which are visible in the drawings and which, where they are visible, are indicated by the reference numeral which identifies the respective belt, accompanied by an apostrophe) of the side-wall conveyors are in positions almost coinciding with the upstream and downstream ends (also usually defined by so-called feathers 2', 3') of the corresponding main conveyors 2, 3.

In the case of the downstream end of the device, although the side-wall conveyors 14a, 14b are disposed with their upstream ends practically level with the upstream end (naturally with reference to the direction of advance of the products P) of the main conveyor 4, they are longer than the main conveyor 4. This means that the downstream return members of the side-wall conveyors 14a, 14b face a certain portion of the output conveyor O. The two side-wall conveyors 14a, 14b therefore "accompany" the products P, so to speak, and support them by the end flaps L of their packages until they have safely been received on the output conveyor O.

The foregoing corresponds to a solution which may be applied generally, according to specific requirements of use; for example, if products such as the products P shown by way of example in FIGS. 1 and 2 are to be advanced on a main (supporting) conveyor which is divided into several sections in cascade, respective side-wall conveyors may also be divided into several sections in cascade and the connecting regions of the side-wall conveyors may be offset longitudinally from the connecting regions between successive sections of the main conveyor. This solution prevents the products from simultaneously encountering the connecting regions between successive sections both of the main supporting conveyor and of the side-wall conveyors. It is thus preferable in situations in which the orientations of the products are extremely critical.

The upstream ends of the first two side-wall conveyors (that is, the conveyors 12a, 12b) are preferably formed like ramps, in the sense that the upstream end of each of the two conveyor passes of the side-wall conveyors gradually approaches the position in which it is intended to advance.

As regards their end flaps L, the products P which arrive on the device 1 are thus initially taken in by two ramp-like portions 120a, 120b which, so to speak, approach the flaps L gradually and take them over.

In order to achieve this ramp-like shape (according to known criteria which do not need to be described in detail herein), the upstream ends of the conveyor passes of the belts 12a, 12b may be made to pass around return formations (rollers or feathers) which are slightly retracted from the position in which the conveyor pass is intended to advance, support formations, such as rollers or feathers, also being provided slightly downstream of the end return formations to define the final plane of movement of the conveyor passes of the belts.

FIG. 2 shows schematically the way which the movements of the two side-wall conveyors (in the case in question, the conveyors 12a, 12b) can be synchronised precisely with the movement of the respective main conveyor (in the example, the conveyor 2) in order to prevent any out-of-phase condition which could cause the product to be displaced from its desired orientation which is usually selected so as to be perpendicular to the direction of transportation.

This result can be achieved very precisely, for example, by means of a positive drive arrangement which places the movements of the side-wall conveyors under the control of the drive unit which drives the conveyor pass of the main conveyor.

In the embodiment of FIG. 2, the motor (typically, a direct-current electric motor), indicated 20, drives the endless belt 2, the upper pass of which defines the conveyor pass of the main conveyor, by means of a set of transmission rollers.

The same motor 20 transmits its movement, by means of a transmission generally indicated 22, to a drive unit 23 (typically a pair of bevel gears), which drives a drive pulley 24. A belt (or a similar flexible transmission element 25) passes around the drive pulley 24 and, as well as passing around a set of transmission pulleys indicated 26, transmits the movement (in opposite senses) to two further pulleys 27a, 27b. These pulleys 27a, 27b rotate respective rollers 29a, 29b by means of respective pairs of bevel gears 28a, 28b (or equivalent transmission units). The rollers 29a, 29b in turn constitute the drive rollers around which the endless belts, the upper passes of which constitute the conveyor passes of the side-wall conveyors 12a, 12b, are passed.

The rollers 29a, 29b, like the corresponding rollers (indicated 30a and 31a solely in FIG. 1) which perform the same driving function for the side-wall conveyors associated with the further sections of the device 1, are associated, in known manner, with contrarotating pressure rollers 29a', 30a' and 31a', the functions of which are to urge the respective belts firmly against the drive rollers in order to prevent slippage.

Naturally, the principle of the invention remaining the same, the details of construction and forms of embodiment may be varied widely with respect to those described and illustrated, without thereby departing from the scope of the present invention.

What is claimed is:

1. A device for transporting products in packages each having at least one end flap, the device including conveyor means defining a conveyor surface for the packages which are supported on the conveyor surface so that the at least one flap of each package projects sideways from the conveyor surface,
wherein the conveyor means include at least one side-wall portion which is generally inclined to the conveyor surface in order to cooperate with and support the at least one end flap in operation.

2. A device according to claim 1, wherein said conveyor means includes two side-wall portions disposed on opposite sides of the conveyor surface so that the conveyor means are generally channel-shaped.

3. A device according to claim 1, wherein the at least one side-wall portion is inclined to the conveyor surface at an angle of about 135°.

4. A device according to claim 1, wherein the conveyor means are divided into several sections in cascade, each section defining a respective section of the conveyor surface and wherein the at least one side-wall portion is also divided into several sections in cascade.

5. A device according to claim 4, wherein, in at least some sections, the conveyor surface and the respective at least one side-wall portion are substantially coextensive.

6. A device according to claim 4, wherein, in at least some sections, the conveyor surface and the respective at least one side-wall portion are of generally different lengths.

7. A device according to claim 6, wherein, in the section of the conveyor means which is situated further downstream in the direction of flow of the packages, the at least one side-wall portion extends generally further downstream than the conveyor surface in order to favour the transfer of the products onto further conveyor means disposed downstream of the device.

8. A device according to claim 4, wherein the connecting region between the sections of the conveyor surface are generally offset from the connecting regions between the sections of the at least one side-wall portion.

9. A device according to claim 1, wherein at the upstream end of the device, with reference to the direction of flow of the packages, the at least one side-wall portion is generally ramp-like and approaches the at least one end flap gradually, in operation.

10. A device according to claim 1, wherein the conveyor surface and the at least one side-wall portion are defined by endless, motor-driven belt conveyors.

11. A device according to claim 1, wherein respective synchronised drive means are associated with the conveyor surface and the at least one side-wall portion.

12. A device according to claim 11, further comprising a motor which drives said drive means and respective transmissions which transmit the drive from the motor to the drive means.

13. A method of transporting products inserted in packages each having at least one end flap, the method including the step of providing conveyor means defining a conveyor surface for the packages which are supported on the conveyor surface, and the step of placing the packages on the conveyor surface with their flaps projected sideways therefrom, and further including the step of providing at least one side-wall portion in the conveyor means, the at least one side-wall portion being generally inclined to the conveyor surface so as to cooperate with and support the at least one flap.

14. A method according to claim 13, further comprising the step of providing two side-wall portions so that the conveyor means are generally channel-shaped.

15. A method according to claim 13, including the step of inclining at least one side-wall portion of the conveyor surface at an angle of about 135°.

16. A method according to claim 13, comprising the further steps of:
dividing the conveyor means into several sections in cascade so that each section defines a respective section of the conveyor surface; and
dividing at least one side-wall portion into several sections in cascade.

17. A method according to claim 16, comprising the step of making the conveyor surface and the respective at least one side-wall portion substantially coextensive for at least some sections.

18. A method according to claim 16, comprising the step of making the conveyor surface and the respective at least one side-wall portion of generally different lengths for at least some sections.

19. A method according to claim 18, comprising the step of extending the at least one side-wall portion generally further downstream than the conveyor surface on the section of the conveyor means which is situated further downstream in the direction of flow of the packages, in order to favour the transfer of the packages onto further conveyor means disposed further downstream.

20. A method according to claim 16, comprising the step of offsetting the connecting region between the sections of the conveyor surface from the connecting regions between the sections of the at least one side-wall portion.

21. A method according to claim 13, comprising the step of making the at least one side-wall portion generally ramp-like and approaching the at least one end flap gradually, in operation, and wherein the at least one side-wall portion is located at the upstream end of the method, with reference to the direction of flow of the packages.

22. A method according to claim 13, comprising the step of selecting the conveyor surface and the at least one side-wall portion to be endless, motor-driven belt conveyors.

23. A method according to claim 13, comprising the step of using synchronized drive means to drive the conveyor surface and the at least one side-wall portion.

24. A method according to claim 23, wherein the step of using synchronized drive means includes using a motor which drives said drive means, and using respective transmissions which transmit the drive from the motor to the drive means.

* * * * *

UNITED STATES PATENT AND TRADEMARK OFFICE
CERTIFICATE OF CORRECTION

PATENT NO. : 5,373,685
DATED : December 20, 1994
INVENTOR(S) : Franconi, et al.

It is certified that error appears in the above-indentified patent and that said Letters Patent is hereby corrected as shown below:

Claim 7, col. 6, line 60 change "of the product" to "of the packages"

Signed and Sealed this

Fourteenth Day of October, 1997

Attest:

BRUCE LEHMAN

Attesting Officer   Commissioner of Patents and Trademarks